United States Patent [19]
Hueber

[11] 3,819,033
[45] June 25, 1974

[54] EXPANDABLE SPECTACLE CASE
[75] Inventor: Edward K. Hueber, Penn Valley, Pa.
[73] Assignee: Itek Corporation, Lexington, Mass.
[22] Filed: Oct. 10, 1972
[21] Appl. No.: 296,379

[52] U.S. Cl............... 206/5, 150/52 R, 229/DIG. 3
[51] Int. Cl...................... A45c 11/04, B65d 85/38
[58] Field of Search.................. 206/5 R, 6, 46 FC; 150/52 R; 229/55, 53, DIG. 3; 161/159

[56] References Cited
UNITED STATES PATENTS

| | | | |
|---|---|---|---|
| 1,507,949 | 9/1924 | Angier | 229/DIG. 3 |
| 2,498,202 | 2/1950 | Dingman | 206/5 A |
| 2,650,700 | 9/1953 | Wolf | 206/5 R |
| 3,040,966 | 6/1962 | Crane | 229/53 |
| 3,256,919 | 6/1966 | Ogletree | 229/53 |
| 3,559,798 | 2/1971 | Jacobsen | 206/5 R |
| 3,675,245 | 7/1972 | Follett | 161/159 |

*Primary Examiner*—William T. Dixson, Jr.
*Attorney, Agent, or Firm*—Homer O. Blair; Robert L. Nathans; Gerald H. Glanzhan

[57] ABSTRACT

An expandable spectacle case for holding and supporting eyeglasses of widely varying size and shape. The case consists of a pair of opposed walls joined together to define a pocket therebetween for receiving the glasses. Each wall is constructed of an inner lining of elastic material capable of expanding laterally of the case to receive and hold the glasses, surrounded by an outer covering having an array of severed portions expandable into a mesh-like pattern upon expansion of the inner lining. This construction enables the case to receive glasses of differing size while ensuring that they are effectively held and protected from damage.

9 Claims, 3 Drawing Figures

PATENTED JUN 25 1974 3,819,033

EXPANDABLE SPECTACLE CASE

BACKGROUND OF THE INVENTION

1. Field of the Invention

The present invention relates to an expandable spectacle case capable of accommodating many of the great variety of spectacle shapes and sizes presently being worn.

2. Description of the Prior Art

To meet public demand, eye glasses today are manufactured in an immense variety of different sizes, shapes, and styles and this has created several new problems in the eyewear industry. For one thing, the wide variety of spectacle sizes and shapes now available has also made it necessary to provide a large assortment of eye glass case sizes to accommodate them. This, in turn, has made it necessary for the optometrist or other supplier to maintain larger inventories of cases than before, resulting in greater storage requirements and generally increased expenses. In addition, with the large variety of eye glass case sizes to choose from, the supplier is additionally burdened with the somewhat annoying task of matching the correct case size with a particular pair of eye glasses.

Further adding to the problem is the increasing use of plastic lenses in eye glasses. The surfaces of plastic lenses tend to scratch and become marred somewhat more readily than glass lenses and many of the cases presently available on the market are not able to provide maximum protection for such lenses.

In general, there is a significant need for a single spectacle case that can replace the many case sizes now required and that will adequately protect glasses from damage irrespective of their size and shape. Furthermore, there is a need for an eye glass case for general use that is easy to handle, attractive in appearance and sufficiently inexpensive to permit the supplier of eye glasses to provide them with each pair of glasses he sells.

SUMMARY OF A PREFERRED EMBODIMENT OF THE INVENTION

In accordance with a preferred embodiment of the present invention, the above difficulties have been obviated by providing a novel spectacle case capable of holding eye glasses of widely varying size and shape and that will effectively protect the glasses from damage in the course of normal handling. In accordance with a preferred embodiment, the case is formed with an inner lining of elastic material such as a soft knit fabric surrounded by an outer covering of felt, suede or the like having an array of slots or slits cut therein. Upon insertion of a pair of glasses into the case, the inner lining stretch to receive them and the outer covering will expand into an attractive mesh-like pattern.

Several advantageous features are provided by the above-described case. Initially, due to the elasticity of the inner lining, it will tend to mold itself around the eye glasses and, in this way, substantially prevent them from shifting around within the case and rubbing against the walls of the case or against any debris that might be present in the case. This will reduce the possibility of the lens surfaces becoming scratched or otherwise damaged. In addition, the construction of the outer covering is such that it is not provided with slots in the area adjacent the opening of the case. The absence of slots in this area will prevent the outer covering and, hence, the lining beneath it from significantly expanding around the opening when a pair of eye glasses are inserted into the case with the result that the opening will automatically remain partially closed and the glasses will not readily fall out of the case. Furthermore, this feature will permit the case to retain dimensional stability without the need for any additional reinforcing structure such as wires or the like.

In general, the eye glass case in accordance with the present invention will enable the supplier of eye glasses to utilize a single case for the majority of eye glasses he sells. This will permit him to reduce his inventory and, in general, save him the inconvenience of matching particular eye glass sizes with an appropriate case. The case is also relatively simple to make and inexpensive in cost. Yet further features of the case will become apparent hereinafter.

DETAILED DESCRIPTION OF THE PREFERRED EMBODIMENT

Figure 1:
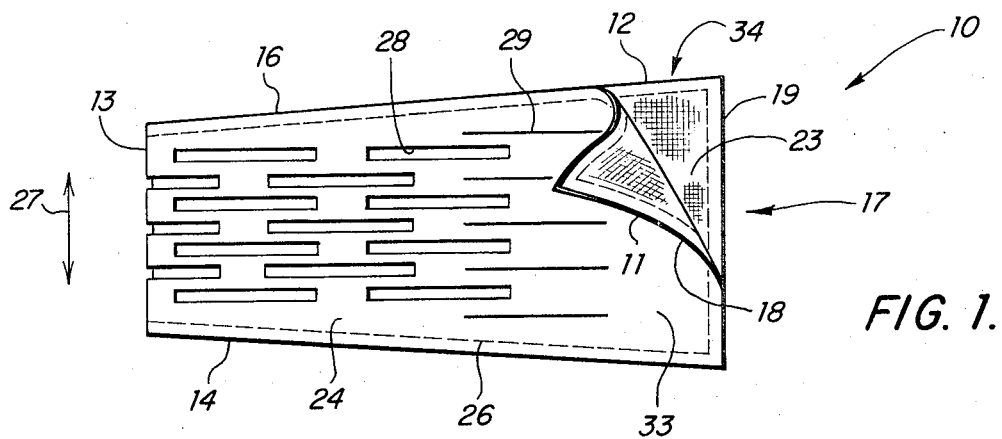
FIG. 1 illustrates a spectacle case in accordance with a preferred embodiment of the present invention.

FIG. 1 illustrates an eye glass case in accordance with a presently preferred embodiment of the invention for holding eye glasses of widely differing size and/or shape. The eye glass case, which is generally identified by the reference number 10, is formed with first and second substantially identical walls 11 and 12 that are joined together at their bottom edges 13 and along their side edges 14 and 16 to define a pocket therebetween having an opening 17 defined by their top edges 18 and 19.

Figure 3:
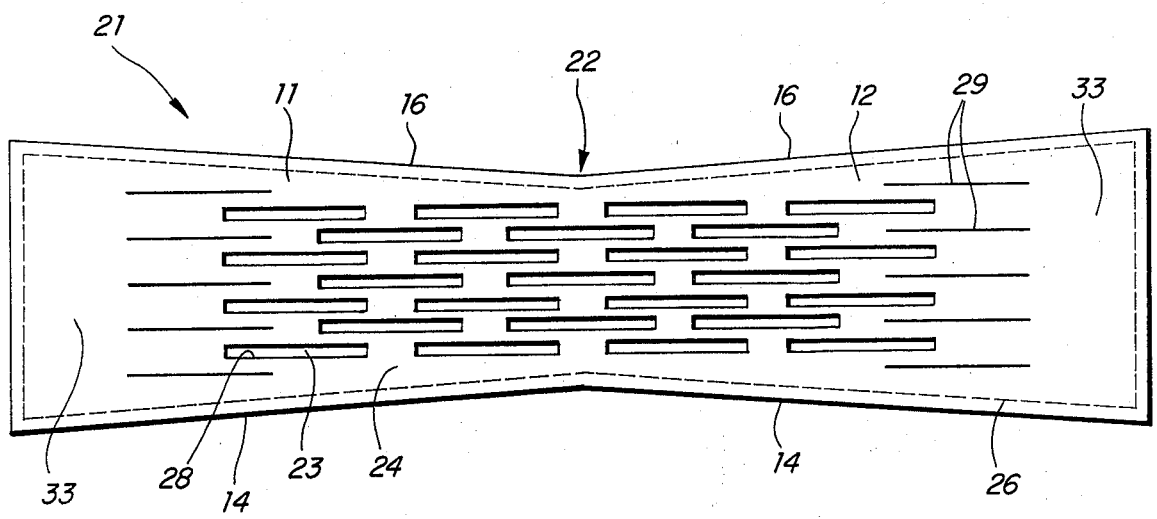
FIG. 3 illustrates a preferred manner of constructing the eye glass case of FIGS. 1 and 2.

The construction of case 10 may be better understood with reference to FIG. 3. As illustrated, the case is preferably formed from a generally bow tie-shaped pattern 21 by folding the pattern up over itself at 22 to define a common bottom edge 13 (FIG. 1) and thereafter sewing or otherwise securing the resultant walls 11 and 12 together substantially along the edges 14 and 16 to form the pocket therebetween. Obviously, the case could be constructed in other ways as well, if desired.

Referring still to FIGS. 1 and 3, pattern 21, and hence walls 11 and 12 of the case, actually consists of two layers; an inner lining 23 and an outer covering 24 which are stitched or otherwise secured together around their periphery as illustrated at 26 in FIGS. 1 and 3. Inner lining 23 is constructed of a flexible material such as nylon tricot or other knit fabric that is capable of stretching to receive a pair of eye glasses inserted into the pocket and that will resiliently deform around the eye glasses. Preferably, this fabric is expandable only in one direction, i.e. laterally of the case as illustrated by the arrow 27 and is substantially non-expandable longitudinally of the case for a reason to be explained hereinafter.

Outer covering 24 may be made of many materials such as felt, leather, suede, vinyl or the like and is preferably non-elastic in nature. Covering 24 is, however, provided with an array of severed portions which may take the form of relatively wide slots 28 or narrow slots or slits 29 (both being illustrated on the same case for explanatory purposes only) or some other shape. These portions are arranged over the surface of the covering in an array of substantially parallel rows of spaced slots with the slots in alternate rows being in staggered relationship such that upon expansion of the outer covering, the array of slots will form into a mesh pattern as illustrated more clearly in FIG. 2.

Figure 2:
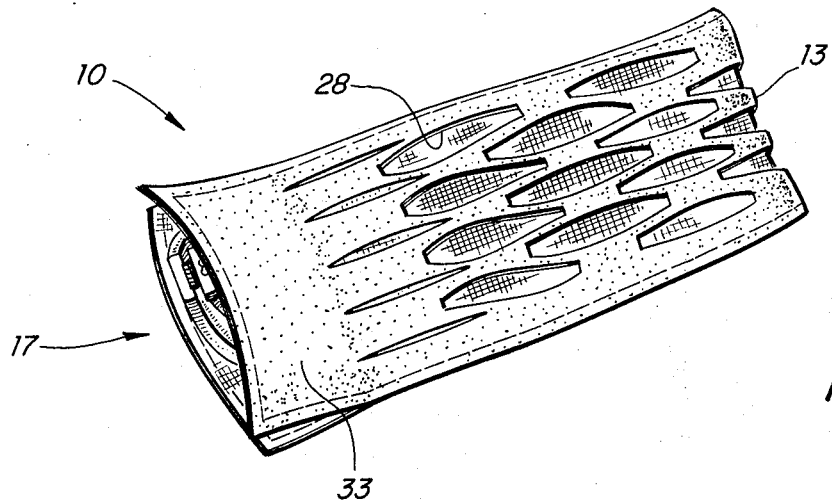
FIG. 2 illustrates, in plan view, the spectacle case of FIG. 1 having a pair of eye glasses inserted therein.

By constructing the case in this manner, upon insertion of a pair of glasses into the case through the opening 17, the inner lining will expand laterally due to its elasticity to accommodate the glasses. At the same time, the outer covering will also expand and form into an attractive mesh-like pattern as shown in FIG. 2. The inner lining, being elastic in nature, will also deform around the glasses and, in this way, effectively prevent them from freely moving or shifting within the case. This will provide improved protection to the glasses and, in particular, to the lenses, and reduce the chances of their being scratched or otherwise marred by any debris that may enter into the case. Furthermore, since the lining will expand only laterally and not longitudinally, the case will have substantial dimensional stability and the temples or other protrusions on the eye glasses will be substantially prevented from poking through the case and from forming unsightly bulges in the case.

It should also be noted in the Figures that the array of slots in the covering do not extend all the way to the top edges 18 and 19 of the case but stop short to define an unsevered area 33 adjacent the opening 17 of the case. This structure provides several advantages. Initially, because it is not slotted, neither area 33 nor the lining underneath it will be able to expand to any significant extent when a pair of eye glasses are inserted. As a result, the opening 17 will tend to keep its shape and remain partially closed thus preventing the eye glasses from readily falling out of the case. Thus, this construction also eliminates the need for any kind of closure for the case as well as the need for any reinforcing structure to retain the shape of the case.

The case is also preferably tapered inwardly toward bottom edge 13 to ensure even firmer support of the glasses within the case. Also, the upper portion of side edges 14 and 16 of walls 11 and 12 are preferably not stiched together to provide flaps 34 that will enable easy insertion and removal of the eye glasses from the case.

In general, the eye glass case in accordance with the present invention will readily accept eye glasses of widely varying size and shape and will firmly hold them substantially free from movement. The construction of the elastic inner lining surrounded by a slotted outer covering not only makes this possible but also provides an attractive product. For example, since the inner lining 23 is visible through the mesh covering, a pleasing visual pattern can be provided by making the two layers in contrasting colors. Also, the case is simple to manufacture and inexpensive in cost and the supplier of eye glasses can economically furnish them with each pair of eye glasses he sells.

While a preferred embodiment of the invention has been described, the teachings of this invention will readily suggest many other embodiments to those skilled in the art. Accordingly, it should be understood that numerous alterations, omissions, and additions may be made without departing from the spirit thereof and the invention should be limited only as required by the scope of the following claims.

I claim:

1. An eyeglass case for holding eyeglasses of varying size comprising a pair of elongated opposed walls defining a pocket therebetween for receipt of said eyeglasses, said walls being expandable laterally of said case and substantially non-expandable longitudinally of said case and including:
   a. an elastic inner lining; and
   b. an outer covering surrounding said inner lining, said outer covering having an array of severed portions arranged thereon for enabling said covering to expand into a mesh-like pattern upon expansion of said inner lining.

2. An eye glass case as recited in claim 1 wherein said inner lining comprises a knit fabric.

3. An eye glass case as recited in claim 1 wherein said array of severed portions comprises a plurality of longitudinal substantially parallel rows of severed portions arranged with the severed portions in adjacent rows being in staggered relationship.

4. An eye glass case as recited in claim 3 wherein said severed portions comprise slots.

5. An eye glass case as recited in claim 1 wherein said walls have top and bottom edges, said top edges defining an opening therebetween for insertion of said eye glasses into said pocket, and wherein said array of severed portions extends from the bottom edges of said walls to a position spaced from the top edges of said walls for defining an unsevered area adjacent the top edges of said walls for substantially preventing expansion of said walls adjacent said opening.

6. An eye glass case as recited in claim 1 wherein said walls are tapered inwardly from their top edge to their bottom edge.

7. An eye glass case for holding eye glasses of varying size comprising a pair of opposed walls defining a pocket therebetween for receipt of a pair of eye glasses, said walls comprising:
   a. an elastic inner lining; and
   b. an outer covering surrounding said inner lining, said outer covering having an array of severed portions arranged thereon for enabling said covering to expand into a mesh-like pattern upon expansion of said inner lining.

8. An eye glass case as recited in claim 7 wherein said array of severed portions comprises a plurality of longitudinal substantially parallel rows of severed portions arranged with the severed portions in adjacent rows being in staggered relationship.

9. An eye glass case as recited in claim 8 wherein said severed portions comprise slots.

* * * * *